Feb. 8, 1927.
F. T. POWERS
1,617,080
PHOTOGRAPHIC CAMERA
Original Filed Feb. 19, 1918    2 Sheets-Sheet 1
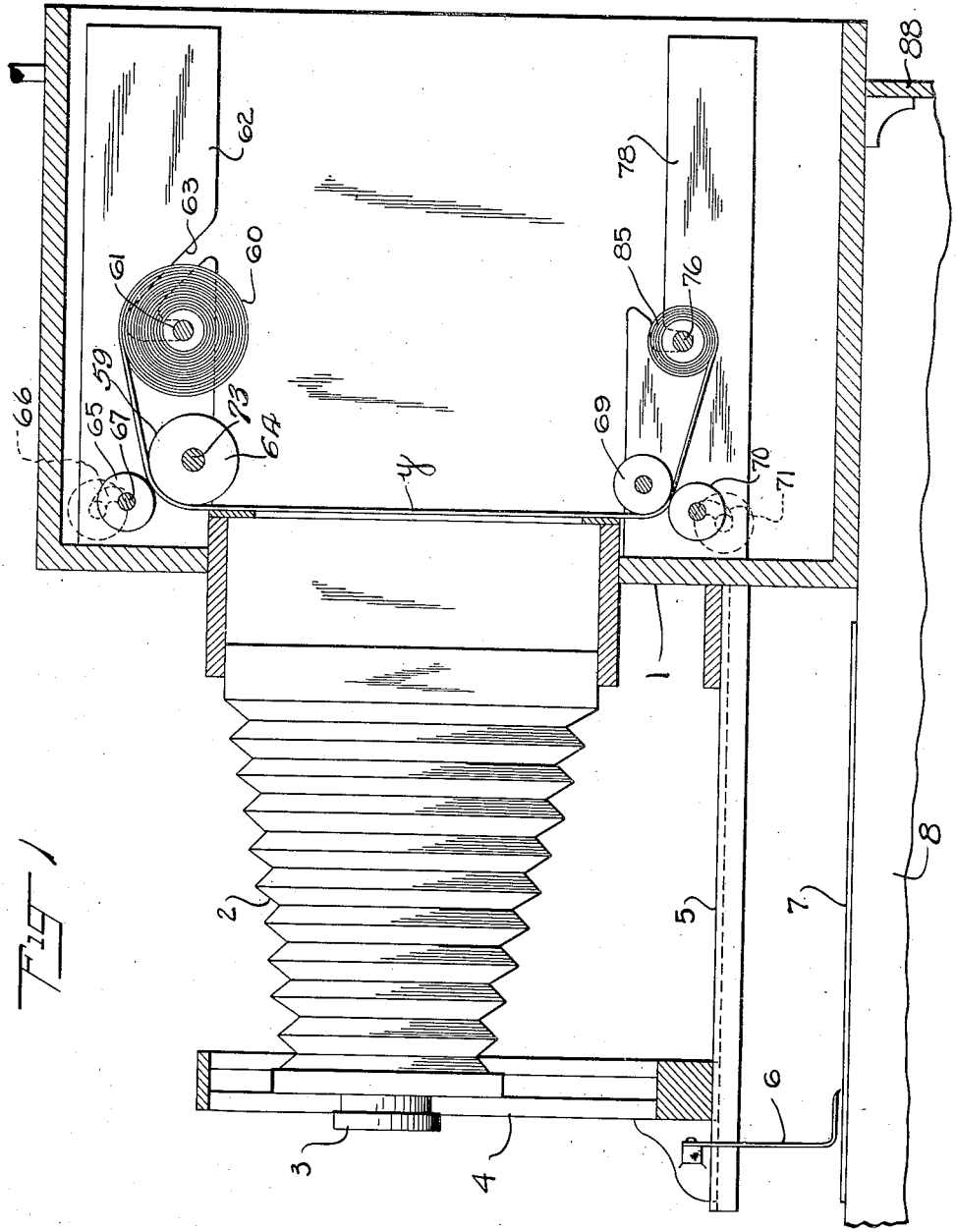
INVENTOR
F. T. Powers
BY John D. Morgan
ATTORNEY

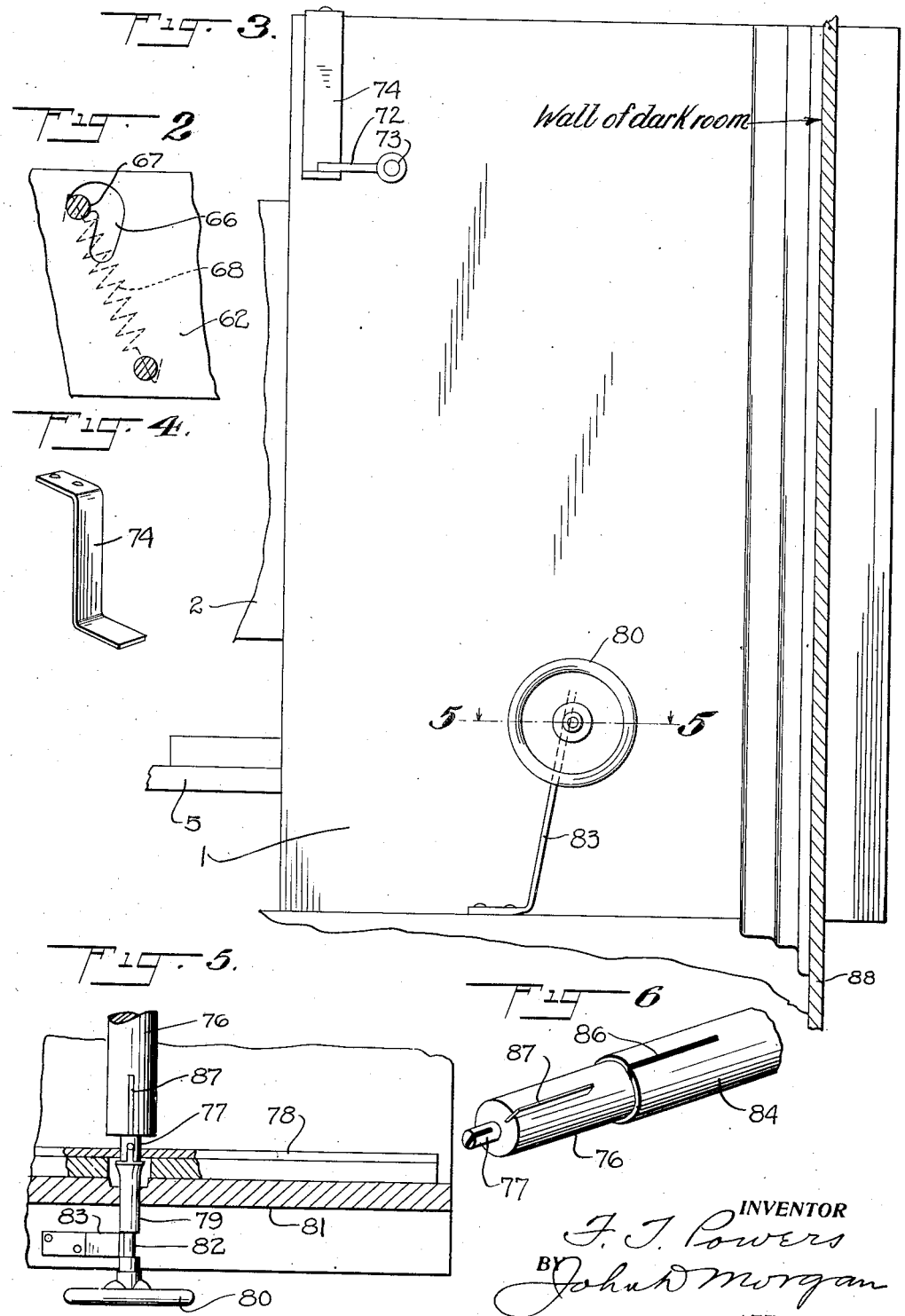

Patented Feb. 8, 1927.

1,617,080

UNITED STATES PATENT OFFICE.

FRANK T. POWERS, OF NEW YORK, N. Y., ASSIGNOR TO POWERS PHOTO ENGRAVING COMPANY, OF NEW YORK, N. Y., A CORPORATION OF NEW YORK.

PHOTOGRAPHIC CAMERA.

Original application filed February 19, 1918, Serial No. 218,059. Divided and this application filed December 7, 1921. Serial No. 520,621.

The invention relates to photographic camera, and in certain respects more particularly to apparatus which is especially adapted for copying work.

Objects and advantages of the invention will be set forth in part hereinafter, and in part will be obvious herefrom, or may be learned by practice with the invention; such objects and advantages being attained through the means and combinations pointed out in the appended claims.

The invention consists in the novel parts, constructions, arrangements, combinations and improvements herein shown and described.

The accompanying drawings, herein referred to and constituting a part hereof, illustrate one embodiment of the invention, and together with the description serve to explain the principles thereof.

Of the drawings:

Fig. 1 is a vertical, longitudinal section of the camera;

Fig. 2 is a fragmentary elevation, partly in section and further enlarged, of the throw off for the feed rolls for the sensitized web;

Fig. 3 is a fragmentary elevation of the rear of the camera, that is, the right hand end in Fig. 1, showing certain controls for the feeding mechanism for the sensitized web;

Fig. 4 is a detail of the gauge or stop shown at the top of Fig. 3.

Fig. 5 is a horizontal, sectional detail, on the line 5—5 of Fig. 3; and

Fig. 6 is a perspective, fragmentary detail of a part of the roller actuating and controlling mechanism of Fig. 5, shown on a larger scale.

This application is a division of application Serial No. 218,059, filed Feb. 19, 1918, allowed May 18, 1921, refiled July 24, 1923, Ser. No. 653,618.

In accordance with the invention, the rear end of the camera opens into a dark room, in such a way, that the film holding roll and film receiving roll are accessible from within the dark room whereby the film is demountable into the dark room.

Suitable means for feeding the film past the place of exposure, including means for winding up the roll of exposed film, preferably accessible from outside both the camera and dark room, are provided. Mechanism is provided for feeding the film forward in lengths just sufficient for single exposures, and for marking successive lengths. Suitable guide and tension rollers for controlling the movement of the film are provided.

Referring in detail to the embodied form of camera, the camera body 1 is shown, having connected therewith the usual extensible and contractible bellows 2, the lens 3 being carried by a support 4 at the front end of the bellows. The lens supporting frame 4 is slidable to and fro upon guideways 5, in a well-known manner, to focus the camera.

In accordance with the invention, and as embodied, there is provided within the camera a web $y$ of light-sensitive material for receiving successive exposures, one after another, so that it is only necessary to feed forward the web $y$, for the space or distance occupied by an exposure between the successive exposures. In connection therewith, means are provided for readily inserting an unexposed roll, for removing an exposed roll, or a portion thereof, and for threading the web through the camera.

As embodied a roll 60 of sensitized film, paper or other suitable material is carried upon a shaft or mandrel 61, the shaft 61 being rotatably supported in side frame pieces 62. In the frame pieces 62 are provided slots 63, preferably primarily upwardly and then downwardly disposed or directed, so that the roll 60 may be easily and readily lifted into position, and will then remain therein until intentionally removed.

The web or strip $y$ of light sensitive material is presented at, and guided past, the focal plane or plane of exposure of the camera by suitable means. The embodied form thereof comprises in part a pair of cooperating guide and tension rollers 64 and 65. The roller 64 is preferably maintained in fixed position, the roller 65 being spring-pressed thereagainst and also movable toward and away therefrom to facilitate the introduction of new web or strip $y$ into the camera.

The embodied form of means for effecting these functions comprises a pair of shouldered slots 66 (Figs. 1 and 2) formed in the frame plates 62, the pintles 67 of which there are two, one being shown in Fig. 2 of the roller 65 projecting through the respective slots 66. The pintles 67 are acted upon by springs 68, which tend to press the roller 65 resiliently toward the roller 64 with the strip y therebetween. When the roller 65 is lifted upwardly by the operator it will pass to and be held in the position shown in Fig. 2, thereby maintaining the rolls 64 and 65 in separated position while the strip is threaded therethrough, and when the roll 65 is drawn slightly upwardly and to the right in Fig. 2 it will pass to the spring-pressed tensioning position shown in Fig. 1.

A device may be provided to mark the locations of the exposure, such as a point 59 on roller 64, so that the exposures may be located on the strip previous to development if desired.

A second pair of guide and tension rolls 69 and 70 respectively are shown cooperating with the web y upon the opposite side of the place of exposure in the camera, and these rolls preferably are similar in operation and construction to the rolls 64 and 65, already described. The means for holding off the roll 70 during the threading through of the web, and permitting it to press resiliently against the web during the feeding forward thereof, are indicated generally by reference numeral 71 in Fig. 1.

Means are provided by the invention for accurately measuring and positioning the successive exposures made upon the sensitive web y and in the embodied form thereof, there is provided on the exterior of the camera (Fig. 3) an arm 72 fixed on the shaft 73 of the roller 64. Cooperating with the arm 72 is a spring stop 74, (Figs. 3 and 4). The arm 72 normally engages the stop 74, and thus the strip y is held stationary. After an exposure is made, the operator presses back the spring 74 so as to clear the arm 72, which arm rotates with the forward feed of the strip or web y, but as the arm completes its rotation it engages again with the stop 74 after the web y has been fed forward just sufficiently for the next exposure.

Means are provided for drawing forward and rewinding the strip or web y, and the embodied form thereof comprises the shaft 76 having pintles 77 journaled in supporting frames or plates 78 at the sides of the camera. One of the pintles 77 (Fig. 5) is slotted or kerfed at its end, to receive the tongued end of a longitudinally slidable shaft 79. Shaft 79 is provided with suitable turning means, such as a crank or handwheel 80. The shaft 79 journaled in the camera wall, or other suitable support 81, to have the requisite longitudinal movement. Shaft 79 has formed therein an annular groove 82, into which presses a leaf spring 83, holding the shaft 79 in engagement with the pintles 77. If the spring 83 be pressed backwardly, shaft 79 may be moved longitudinally and the shaft or mandrel 76 may be removed and replaced, and after reengagement of pintles 77 with the shaft 79, spring 83 will cause them to always rotate together.

In Fig. 6 a hollow cylinder 84, which may be of pastboard, metal, or other suitable material is shown as a support for the rewound roll of the sensitized web y after exposure. The tube 84 may be slipped upon the shaft 76. Tube 84 may have a slot 86 therein, engaging with a spline or feather 87 on the shaft 76 to cause the tube to rotate with the shaft, while permitting ready removal and replacement thereof.

In accordance with one feature of the invention, the interior of the camera communicates preferably permanently with the dark room, thereby obviating and avoiding the employment of plate or roll holders, and the transporting of the light sensitive rolls or plates to and from the dark room and camera before and after exposing. As embodied (Figs. 1 and 3), the camera body 1 opens at the rear through the wall 88 of the dark room. Thus no closure is required for the end of the camera, which may be always open, and always accessible to the operator, who may remove the exposed roll 85 in whole or in part, and may carry it to the developing apparatus without any covering or protection, and just as the condition or exigencies of the work in the dark room may permit or require. If the use of a plate or plates at any time is requisite or convenient, they may be placed in the camera in the dark room and removed after exposure in the same free and unguarded manner as the strip or web y, and developed in the dark room.

The invention in its broader aspects is not limited to the precise constructions herein shown and described, nor to any particular details of construction, but changes may be made therein without departing from the principles of the invention, and without sacrificing its chief advantages.

What I claim is:—

1. A camera including in combination a chamber, supply and receiving rolls for a film, respectively supported on opposite sides of the chamber, guide rollers mounted on opposite sides of the chamber, tension rollers respectively spring pressed toward said guide rollers, which are also positionable away from the guide rollers for facilitating the feeding of film between respective pairs of rollers, and means cooperating with one of said guide rollers for stopping its rotation after an amount of film for one exposure has passed over it.

2. A camera including in combination means for holding a strip of light sensitive material, means including a guide roller for guiding the strip past the exposure position in the camera, a tension roller cooperating with the guide roller for exerting a tension on the strip held between the two rollers, both rollers being supported by the sides of the camera, and means including a member having a bent slot for holding the tension roller in contact or out of contact with the guide roller.

3. A camera including in combination means for holding a strip of light sensitive material, means including a guide roller for guiding the strip past the exposure position in the camera, a tension roller cooperating with the guide roller for exerting a tension on the strip held between the two rollers, pintles on the tension roller, a bent slotted guideway for the pintles, and springs acting on the pintles for holding them in different positions in the guideway, whereby the tension roller is positionable against or away from the guide roller.

4. A camera including in combination means for holding a strip of light sensitive material, a pair of guide rollers at opposite sides of the exposure position for the strip, for positioning the strip in the focal plane of the camera a pair of tension rollers respectively cooperating with the guide rollers, and means for holding each tension roller against or away from its guide roller.

5. A camera including in combination means for holding a strip of light sensitive material, a pair of guide rollers at opposite sides of the exposure position for the strip, a pair of tension rollers respectively cooperating with the guide rollers, a guideway for the tension rollers whereby they may be positioned against or away from the guide rollers, and springs for holding the tension rollers in either of the two mentioned positions in the guideway.

6. A camera including in combination side frame pieces, one at least being provided with an open slot, for holding a roll of light sensitive material, a guide roller and a tension roller for the strip journaled in the side frame pieces, a guideway in which the tension roller is positionable either against or away from the guide roller, and spring means for holding the tension roller in either of its two positions in the guideway.

7. A camera including in combination two pairs of side frame pieces, at least one of each pair being provided with an open slot for respectively holding a supply roll and a take-up roll for a strip of light sensitive material, guide rollers for holding said strip in the focal plane of the camera, and tension rollers adapted to bear against said guide rollers for holding said strip therebetween.

8. A camera including in combination means for holding a strip of light sensitive material, a take-up roll for the strip, a tension roller for the strip, a guideway for the tension roller in which the roller is positionable either against the guide roller or away from it, and spring means for holding the tension roller in either of its two mentioned positions.

9. A camera including in combination a chamber, a bent, slotted guideway at one side of the chamber for detachably holding a roll for a strip of light sensitive material, a bent, slotted guideway at the other side of the chamber for detachably holding a take-up roll for the light sensitive strip, and guide rollers for guiding the strip past the exposure position in the camera, one of said guide rollers also serving to measure off a length of light sensitive material for one exposure.

10. A camera including in combination a chamber, a bent, slotted guideway at one side of the chamber for detachably holding a roll for a strip of light sensitive material, a bent, slotted guideway at the other side of the chamber for detachably holding a take-up roll for the light sensitive strip, a pair of guide rollers, one at either side of the chamber, a pair of tension rollers respectively cooperating with the guide rollers, and means, including springs, for holding the tension rollers pressed toward the guide rollers, and for holding the tension rollers away from the guide rollers.

11. A camera including in combination a chamber, means at opposite sides of the chamber for detachably supporting a supply roll and a take-up roll for a strip of light sensitive material, a guide roller at each side of the chamber for holding the light sensitive material in the focal plane of the camera, a pair of tension rollers respectively cooperating with the guide rollers, spring means for urging the tension rollers toward the guide rollers and means for stopping the rotation of one of the guide rollers after it has measured off a section of light sensitive material sufficient for one exposure.

12. A camera including in combination a chamber, means at opposite sides of the chamber for detachably supporting a supply roll and a take-up roll for a strip of light sensitive material, a guide roller at one side of the chamber having a circumference approximately equal to the length of one exposure, a guide roller at the other side of the chamber, said guide rollers serving to position the strip of light sensitive material in the focal plane of the camera, and means cooperating with the spindle of the first guide roller for stopping further rotation thereof after it has made one revolution.

In testimony whereof, I have signed my name to this specification.

FRANK T. POWERS.